US009010360B1

(12) United States Patent
Older et al.

(10) Patent No.: US 9,010,360 B1
(45) Date of Patent: Apr. 21, 2015

(54) FLOW CONTROL/SHUT-OFF VALVE ASSEMBLY

(71) Applicant: Drexel University, Philadelphia, PA (US)

(72) Inventors: John Older, Springfield, PA (US); Bakhtier Farouk, Mount Laurel, NJ (US); La'Shell Jones, Baltimore, MD (US); Jared Kern, Trucksville, PA (US); Matthew Scholl, Somerville, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 14/476,304

(22) Filed: Sep. 3, 2014

Related U.S. Application Data

(60) Provisional application No. 61/931,567, filed on Jan. 25, 2014, provisional application No. 62/006,059, filed on May 31, 2014.

(51) Int. Cl.

| G05D 7/06 | (2006.01) |
|---|---|
| F16K 21/16 | (2006.01) |
| E03B 7/07 | (2006.01) |
| F16K 17/34 | (2006.01) |
| F16K 31/126 | (2006.01) |
| G05B 15/02 | (2006.01) |

(52) U.S. Cl.
CPC ............. *F16K 21/16* (2013.01); *E03B 7/071* (2013.01); *E03B 7/072* (2013.01); *F16K 17/34* (2013.01); *F16K 31/1262* (2013.01); *G05D 7/0617* (2013.01); *G05B 15/02* (2013.01)

(58) Field of Classification Search
CPC ....... E03B 7/071; E03B 7/072; G05D 7/0635; G05D 7/0617; F16K 21/16; F16K 17/34; F16K 31/1262; G05B 15/02
USPC .......... 137/486, 487, 599.05, 599.06, 599.07, 137/599.11, 599.13, 601.14, 551
See application file for complete search history.

(56) References Cited

U.S. PATENT DOCUMENTS

| 3,386,473 | A | * | 6/1968 | Driscoll ................... 137/599.13 |
|---|---|---|---|---|
| 3,555,901 | A | * | 1/1971 | Delatorre et al. ............... 73/197 |
| 4,180,088 | A | * | 12/1979 | Mallett ..................... 137/87.03 |
| 4,429,571 | A | * | 2/1984 | Kullmann et al. .............. 73/197 |
| 4,977,916 | A | * | 12/1990 | Ohmi et al. ...................... 137/8 |
| 5,056,554 | A | * | 10/1991 | White ............................ 137/486 |
| 5,080,131 | A | * | 1/1992 | Ono et al. ................. 137/599.11 |
| 5,441,070 | A | * | 8/1995 | Thompson ........................ 137/1 |
| 5,568,825 | A | * | 10/1996 | Faulk ........................ 137/624.11 |
| 5,576,486 | A | * | 11/1996 | Paz ................................. 73/197 |
| 5,782,263 | A | * | 7/1998 | Isaacson et al. ........... 137/487.5 |
| 5,794,653 | A | * | 8/1998 | DeSmet et al. ............... 137/486 |
| 5,893,388 | A | * | 4/1999 | Luker ........................... 137/456 |

(Continued)

*Primary Examiner* — William McCalister
(74) *Attorney, Agent, or Firm* — Joseph E. Maenner; Maenner & Associates, LLC

(57) ABSTRACT

A flow valve assembly includes a valve operable between an open position and a closed position and a controller operatively coupled to the valve to operate the valve between the open position and the closed position. A mechanically or electrically operated assembly is provided to determine an amount of fluid flow through the valve when the valve is in the open position. A mechanically or electrically operated mechanism moves the valve from the open position to the closed position when the amount of fluid flow exceeds a predetermined value. A method of operating the valve is also provided.

11 Claims, 8 Drawing Sheets

(56) References Cited

U.S. PATENT DOCUMENTS

| | | | |
|---|---|---|---|
| 5,971,011 A * | 10/1999 | Price | 137/460 |
| 5,979,493 A * | 11/1999 | Simpkins, Jr. | 137/487.5 |
| 6,105,607 A * | 8/2000 | Caise et al. | 137/487.5 |
| 6,209,576 B1 * | 4/2001 | Davis | 137/487.5 |
| 6,229,450 B1 * | 5/2001 | Malmsten | 340/652 |
| 6,237,618 B1 * | 5/2001 | Kushner | 137/1 |
| 6,374,846 B1 * | 4/2002 | DeSmet | 137/15.01 |
| 6,491,062 B1 * | 12/2002 | Croft | 137/624.11 |
| 6,945,274 B1 * | 9/2005 | Davis | 137/624.11 |
| 7,114,516 B2 * | 10/2006 | Ito | 137/487.5 |
| 7,228,726 B2 * | 6/2007 | Kates | 73/40 |
| 7,392,817 B2 * | 7/2008 | Burlage et al. | 137/1 |
| 7,818,094 B2 * | 10/2010 | Rambicourt et al. | 700/282 |
| 7,900,650 B1 * | 3/2011 | Wilson | 137/601.14 |
| 7,970,494 B2 * | 6/2011 | Fima | 700/282 |
| 8,166,999 B2 * | 5/2012 | Ueki et al. | 137/487.5 |
| 8,561,636 B2 * | 10/2013 | Eithun | 137/487.5 |
| 8,606,413 B2 * | 12/2013 | Picton | 700/282 |
| 2004/0163705 A1 * | 8/2004 | Uhler | 137/79 |
| 2005/0224118 A1 * | 10/2005 | Tornay | 137/624.11 |
| 2009/0235992 A1 * | 9/2009 | Armstrong | 137/487.5 |
| 2011/0178644 A1 * | 7/2011 | Picton | 700/282 |
| 2013/0233414 A1 * | 9/2013 | Valencia et al. | 137/546 |

* cited by examiner

FLOW CONTROL/SHUT-OFF VALVE ASSEMBLY

CROSS-REFERENCE TO RELATED APPLICATIONS

The present application claims priority from U.S. Provisional Patent Application Ser. No. 61/931,567, filed on Jan. 25, 2014 and U.S. Provisional Patent Application Ser. No. 62/006,059, filed on May 31, 2014, both of which are incorporated herein by reference in their entireties.

FIELD OF THE INVENTION

The present invention relates to a valve assembly with an automatic shut-off. The valve assembly can be used with a fluid, such as a liquid or a gas.

BACKGROUND OF THE INVENTION

The Environmental Protection Agency estimates that on average a household can waste over 10,000 gallons of water a year to leaks. The two most common household wastes of water are due to leaky faucets and toilets. Unattended faucets that leak at one drop per second can waste up to 2,700 gallons of water a year, while a toilet leaking at one gallon per minute will waste 1,440 gallons per day, and 525,600 gallons a year. According to the American Water Works Association, toilets account for 26.7% of all indoor water use in a typical residence, and 20% of all toilets leak. If a home is left unattended, perhaps when the residents go on a trip or vacation, these leaks can go on for days unnoticed and unstopped. If the flow of a typical shower, 2.2 gallons per minute (GPM), is left to accumulate for a week on the floor of a 1000 ft$^2$ basement, residents would come back to nearly 3 feet of flooding and 22,176 extra gallons on their water bill.

Typical water use through a household water main through a 24 hour period results in large periods of the day water goes unused, with the longest stretches of continuous use being typically less than thirty minutes. Water also generally flows at over one (1) GPM when in use. Unlike normal use, leaks are continuous and usually at a lower rate. A house with leaking water or running faucet would not return to zero in between uses of water. Instead a continuous flow would be detected at all times.

It would be beneficial to develop a control device that can detect leaks based off long uninterrupted flow and stop such leaks.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a flow valve assembly comprising a valve operable between an open position and a closed position and a controller operatively coupled to the valve to operate the valve between the open position and the closed position. A means for determining an amount of fluid flow through the valve when the valve is in the open position and a means for operating the valve from the open position to the closed position when the amount of fluid flow exceeds a predetermined value are also provided.

Further, the present invention provides a flow valve assembly comprising a valve operable between an open position and a closed position, a controller operatively coupled to the valve to operate the valve between the open position and the closed position, and a flow meter operatively disposed downstream of the valve;. A processor is operatively coupled to the flow meter to receive an electronic signal from the flow meter and operatively coupled to the controller to transmit an electronic signal to the controller to operate the valve from the open position to the closed position if the flow meter does not transmit the electronic signal from the flow meter indicating zero fluid flow through the flow meter for a time period greater than a predetermined time period.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
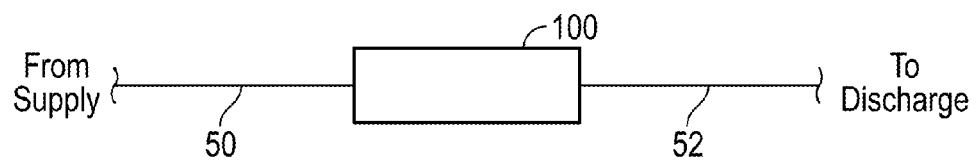
FIG. 1 is a schematic drawing of a control/shut-off valve assembly according to a first exemplary embodiment of the present invention mounted in a fluid system.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "fluid" can mean and material that flows, including a liquid or a gas. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring to FIG. 1, a control/shut-off valve assembly 100 according to a first exemplary embodiment of the present invention is shown. Control/shut-off valve assembly 100 can be used to detect fluid flow downstream of valve assembly 100 and to secure, or shut-off, valve assembly 100 to prevent further fluid flow past control/shut-off valve assembly 100.

Control/shut-off valve assembly 100 has many potential uses, such as, for example, global use in a home or residential building to detect a break in a water line and take corrective action to prevent loss of fluid. Further, control/shut-off valve assembly 100 can be used locally at a particular fixture, such as a toilet, to detect excess "running" of the toilet after a flush and to shut-off flow to that toilet to prevent excessive use/waste of water.

Control/shut-off valve assembly 100 can be incorporated into new construction or "backfit" into an existing fluid line. Control/shut-off valve assembly 100 is inserted between a supply line 50 that is upstream of valve assembly 100 and a discharge line 52 that is downstream of valve assembly 100. Supply line can be in fluid communication with a source of fluid, such as a public water connection, a well, a gas main, or any other fluid source. Discharge line 52 can be in fluid communication with a device, such as a toilet, a faucet, a gas heater, or any other device to which the fluid flows.

Figure 2:
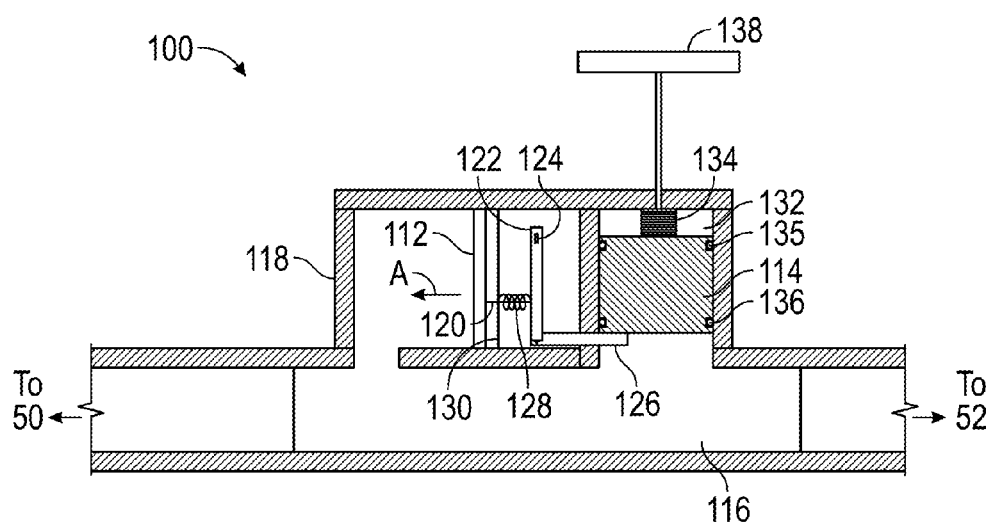
FIG. 2 is a side sectional view of the control/shut-off valve assembly shown in FIG. 1, in an unblocking position.

Control/shut-off valve assembly 100 can be a strictly mechanical assembly that can be used for relatively low value applications, such as, for example, a toilet. FIG. 2 shows an enlarged schematic of an exemplary mechanical system that can be used to operate assembly 100.

Control/shut-off valve assembly 10 uses a diaphragm 112 and a piston 114 to close assembly 100 if too much fluid passes through assembly 100. Control/shut-off valve assembly 100 includes a through-passage 116 through which the fluid flows. A vacuum chamber 118 is located outside of through-passage 116. Diaphragm 112 makes up a wall of vacuum chamber 118.

Diaphragm is coupled to a first end of a diaphragm lever 120. A second end of diaphragm lever 120 is coupled to a first linkage arm 122. First linkage arm 122 is pivotally coupled at a first end to pivot point 124 and at a second end to the first end of a second linkage arm 126. Second linkage arm 126 serves as a support to keep piston 114 out of through-passage 116 in a "no flow" condition. A first end of a first biasing member 128 biases first linkage arm 122 to the position shown in FIG. 2. A second end of first biasing member 128 pushes against a support 130.

Piston 114 is located inside a piston housing 132. A second biasing member 134 biases piston 114 against the top of piston housing 132 toward through-passage 116. O-rings 135, 136 around the circumference of piston 114 maintain a seal between piston 114 and piston housing 132 to prevent fluid from leaking past piston 114. A handle 138 is connected to the top of piston 114 and extends outwardly through the top of piston housing 132.

Figure 3:
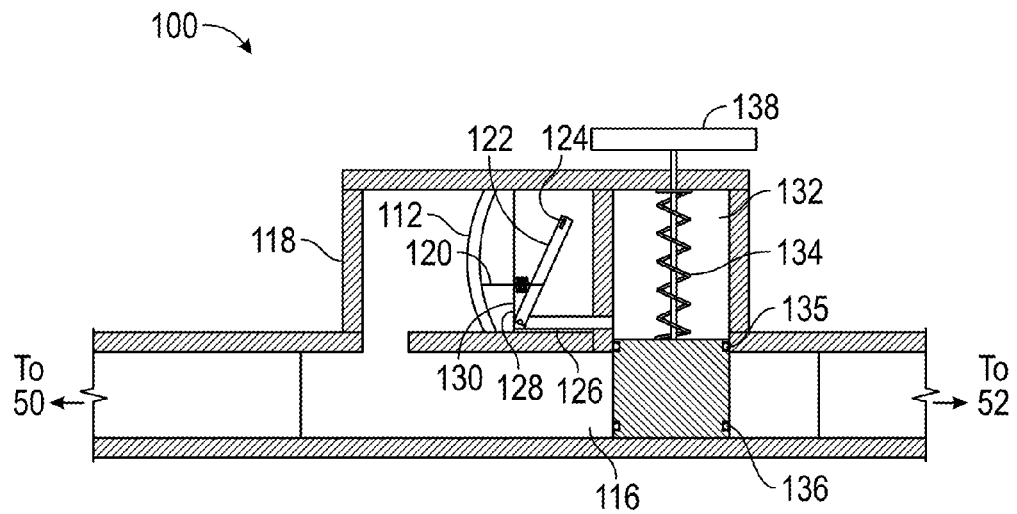
FIG. 3 is a side sectional view of the valve assembly shown in FIG. 1, in a blocking position.

When fluid flows from supply line 50, through the passage 116, to discharge line 52, a venturi effect draws any fluid from vacuum chamber 118 into through-passage 116, which in turn draws diaphragm 112 toward the direction of arrow A in FIG. 2 toward the position shown in FIG. 3. The movement of diaphragm 116 pulls diaphragm lever 120 to the left, from the position shown in FIG. 2 to the position shown in FIG. 3.

As diaphragm lever 120 moves to the left, first linkage arm 120 pivots about pivot point 124 and pulls second linkage arm 126 to the left, from the position shown in FIG. 2. If more than a predetermined amount of fluid flows through through-passage 116, second linkage arm 126 is pulled to the position shown in FIG. 3, in which second linkage arm 126 is pulled away from piston 114 and piston is forced by second biasing member 134 into through-passage 116, thereby shutting off flow of fluid through through-passage 116. If the flow of fluid through through-passage 116 is not excessive (i.e., within predetermined limits), then second linkage arm 126 is not pulled all of the way to the left as shown in FIG. 3, and maintains piston 114 within piston housing 132.

To reset piston 116 after it has been released from piston housing 132, handle 138 is pulled outward, raining piston 114 back into piston housing. First biasing member 128 forces first linkage arm 122 back to the position shown in FIG. 2, which in turn moves second linkage member 126 back under piston 114 to retain piston 114 within piston housing 132.

Figure 4:
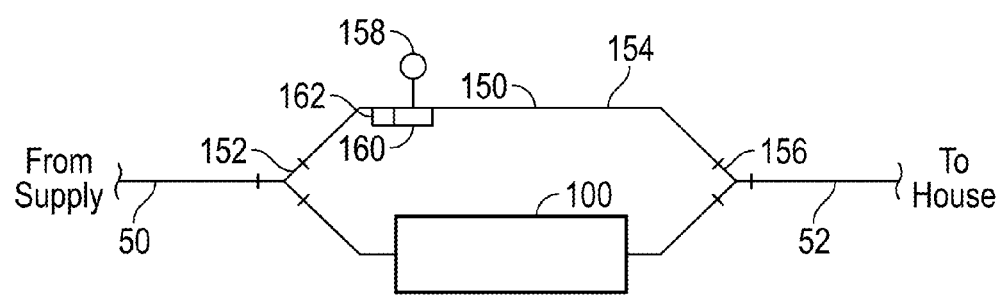
FIG. 4 is a schematic view of an alternative embodiment of a fluid system incorporating the control/shut-off valve assembly of FIGS. 1-3.

Optionally, as shown in FIG. 4, control/shut-off valve assembly 100 can also include a bypass assembly 150. Bypass assembly 150 can be used when the user intentionally plans to use an excessive amount of water for a prolonged period of time, such as, for example, for watering a lawn. Bypass assembly 150 includes a first Y-valve 152 that can be operated in a first position to direct fluid from supply line 50 through valve 110 or a second position to direct fluid around valve 110 to a bypass line 154. Bypass assembly 150 also includes a second Y-valve 156 that can be operated in a first position to allow fluid flowing from valve 110 to flow to discharge line 52 or a second position to allow fluid to flow from bypass line 154 to discharge line 52.

First and second Y-valves 152, 156 can be manually operated or electrically operated. Additionally, bypass assembly 150 can include an audible alarm 158 to indicate that bypass assembly 150 is in "bypass" mode. For example, if the user is in bypass mode and is using water to water a lawn, alarm 158 can sound over intermittent time periods such as, for example, every few minutes (similar to a smoke alarm whose battery is dying), to remind the user that the fluid system is in "bypass" mode.

Audible alarm 158 can be electrically connected to any part of bypass assembly 150. Audible alarm 158 can be connected to an optional flow meter 160 in bypass line 156. If flow meter 160 detects any fluid flow within bypass line 154, electronics 162 trigger audible alarm 158 to activate. When Y-valves 152, 156 are reset to transfer fluid through valve 100, flow meter 160 will detect no flow, and electronics 162 will no longer transmit a signal to audible alarm 158 to activate.

Figure 5:
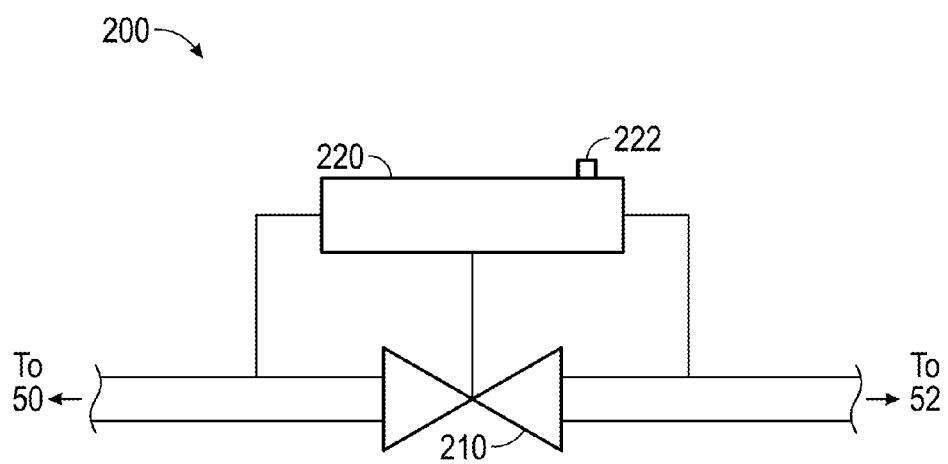
FIG. 5 is a schematic view of an alternative embodiment of a control/shut-off valve assembly according to the present invention.

An alternative embodiment of a valve assembly 200 according to the present invention is shown schematically in FIG. 5. Valve assembly 200 is an electrically operated assembly and can be used for higher value applications, such as, for example, on the supply line to an apartment or office building. Valve assembly 200 includes a valve 210 that is operable between a fully open and a fully closed position. In an exemplary embodiment, valve 210 can be a ball valve, a butterfly valve, a stop valve, a gate valve, a solenoid valve, or any other known valve that can be electrically activated to a fully closed position so that no fluid passes through valve 210.

Valve assembly 200 also includes an electronic flow detector 220 that determines whether fluid is flowing past valve 210. Flow detector 220 can measure the delta pressure on either side of valve 210. When fluid is not flowing through valve 210 (i.e., when discharge line 52 does not have fluid flowing therethrough), the fluid pressure on both the upstream side and downstream side of valve 210 should be the same, resulting in no delta pressure. In this condition, valve 210 is in an open position.

If, however, a pressure difference of greater than zero is measured between the upstream and downstream sides of valve 210, fluid is flowing through valve 210.

If a pressure difference of greater than zero is measured for longer than a predetermined period of time, valve 210 is automatically closed to prevent additional water flow through valve 210. For example, if valve assembly 200 is attached to a supply for a toilet (not shown), if flow detector 220 detects fluid flow for over 10 minutes, valve assembly 200 will assume that the toilet is "running" and transmits a signal to close valve 210.

To open valve 220 to allow fluid flow therethrough after valve 220 has closed, a reset button 222 on flow detector 220 can be pushed to transmit an electronic signal to open valve 210 and allow fluid to flow through valve 210.

Figure 6:
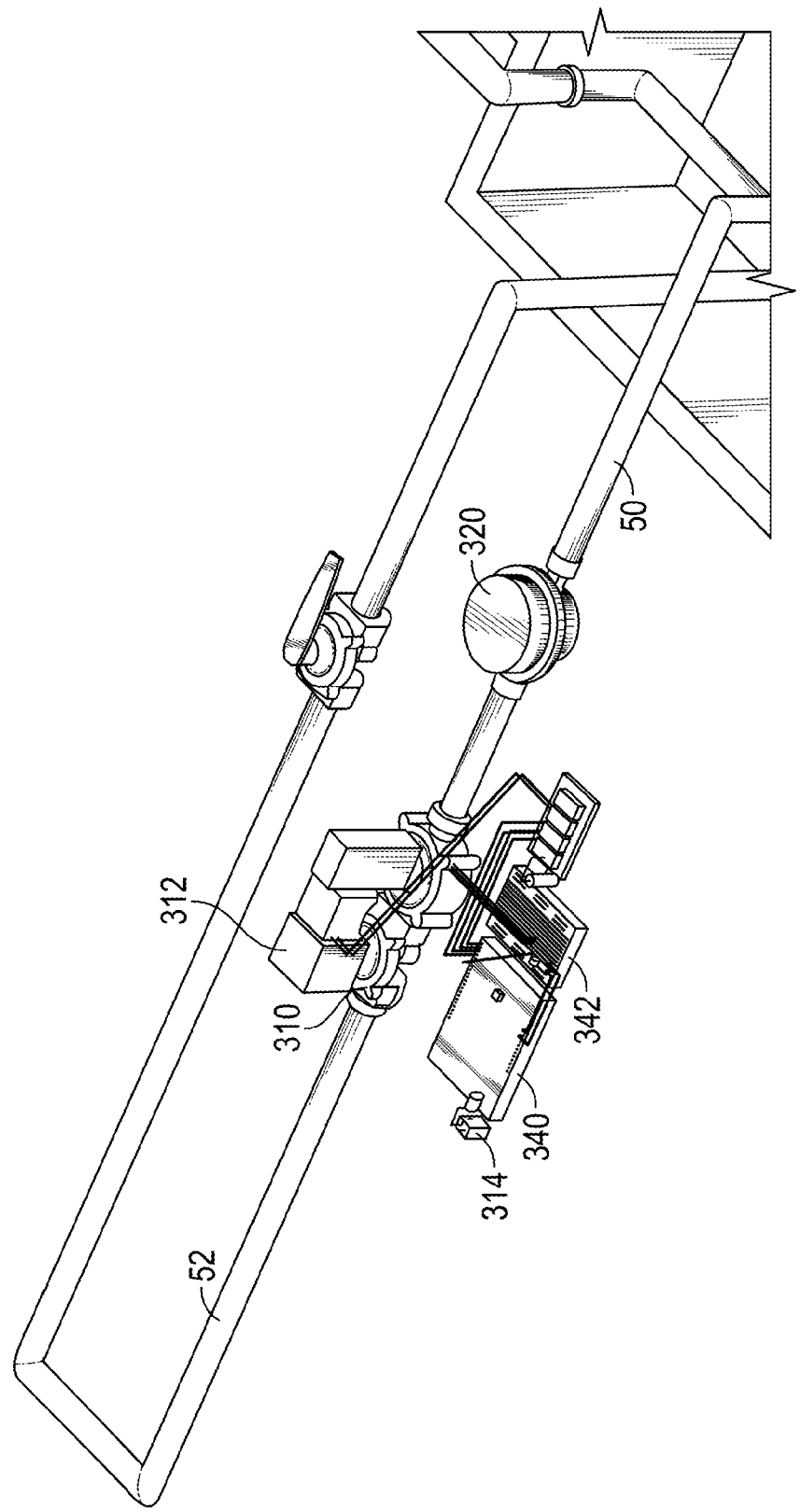
FIG. 6 is a schematic view of an alternative embodiment of a microprocessor controlled control/shut-off valve assembly according to the present invention.
Figure 7:
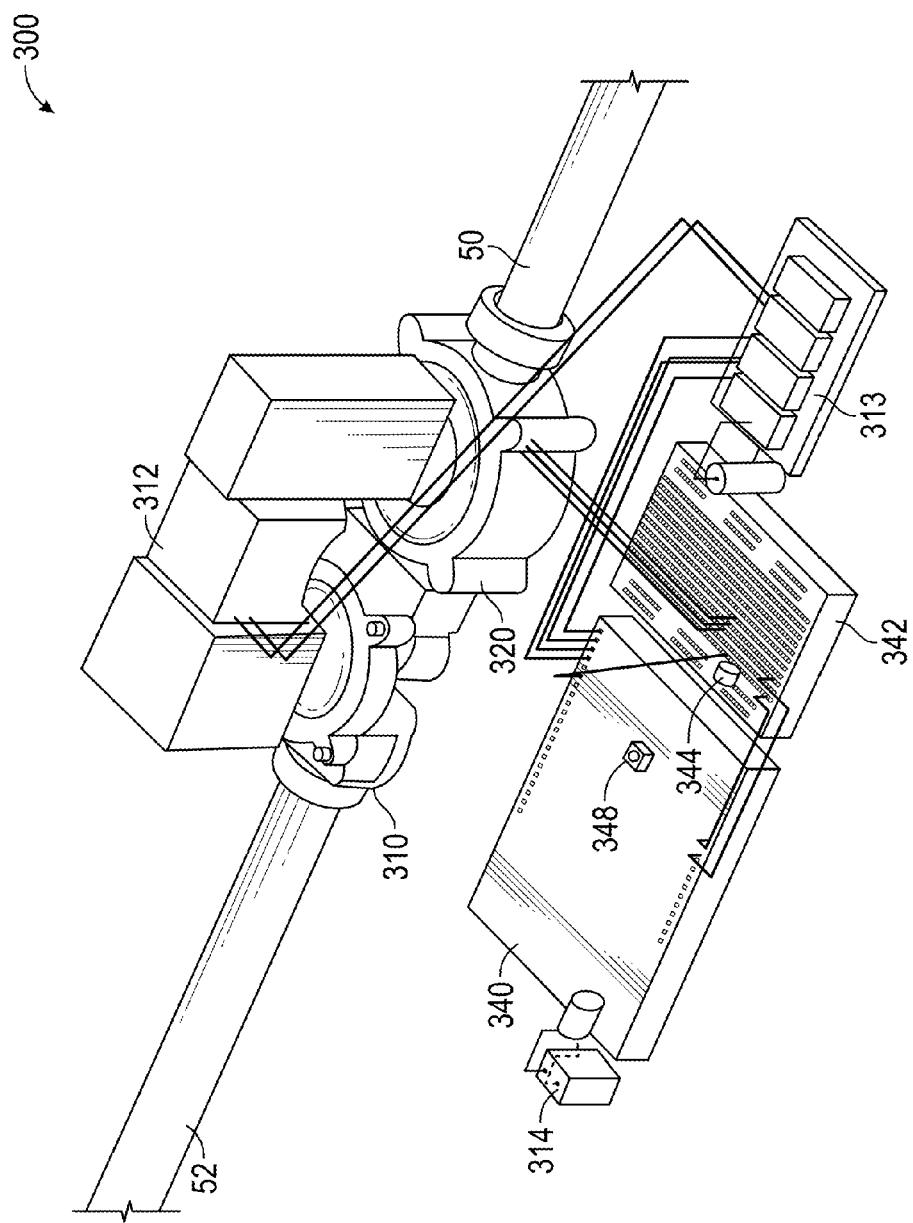
FIG. 7 is an enlarged schematic view of the control/shut-off valve assembly shown in FIG. 6.

Referring now to FIGS. 6 and 7, a valve assembly 300 according to another exemplary embodiment of the present invention is shown. Valve assembly 300 is electrically operated microprocessor controlled and can be used with different fluids, such, for example, water, gas, or other such fluid.

Valve assembly 300 includes a valve 310 in fluid communication with a flow meter 320. Valve assembly 300 is installed in a fluid system between supply line 50 and discharge line 52. In an exemplary embodiment, valve 310 can be located operationally downstream from flow meter 320, as shown in FIG. 6, although those skilled in the art will recognize that valve 310 can alternatively be located operationally upstream from flow meter 320.

Valve 310 can be a ball valve, a butterfly valve, a solenoid valve, or some other type of valve that can open and close with a minimum amount of operation of a valve actuator. Valve 310 includes a valve controller 312 that operates valve 310 between an open position and a closed position. Valve controller 312 can be operated by a direct current (DC) power source, such as a battery 314 (shown in FIG. 8). Due to the application of valve 310, in an exemplary embodiment of the present invention, valve 310 is typically maintained in either a fully closed or a fully open condition. It is typically not desired to "throttle" valve 310 in a partially open condition.

Flow meter 320 can include a water turbine that rotates as fluid passes through. An exemplary flow meter 320 can be a G5/4" SEN02142B flow meter that is presently commercially available. The frequency of the rotation is measured and converted to a flow rate of the fluid through flow meter 320 by a controller 340, such as a microprocessor, that is electronically coupled to both valve 310 and flow meter 320. A breadboard 342 provides connections to controller 340. Breadboard 342 is used for developmental purposes and those skilled in the art will recognize that a commercial version of valve assembly 300 can incorporate the functions of breadboard 342 into controller 340, and breadboard 342 can be eliminated.

Figure 8:
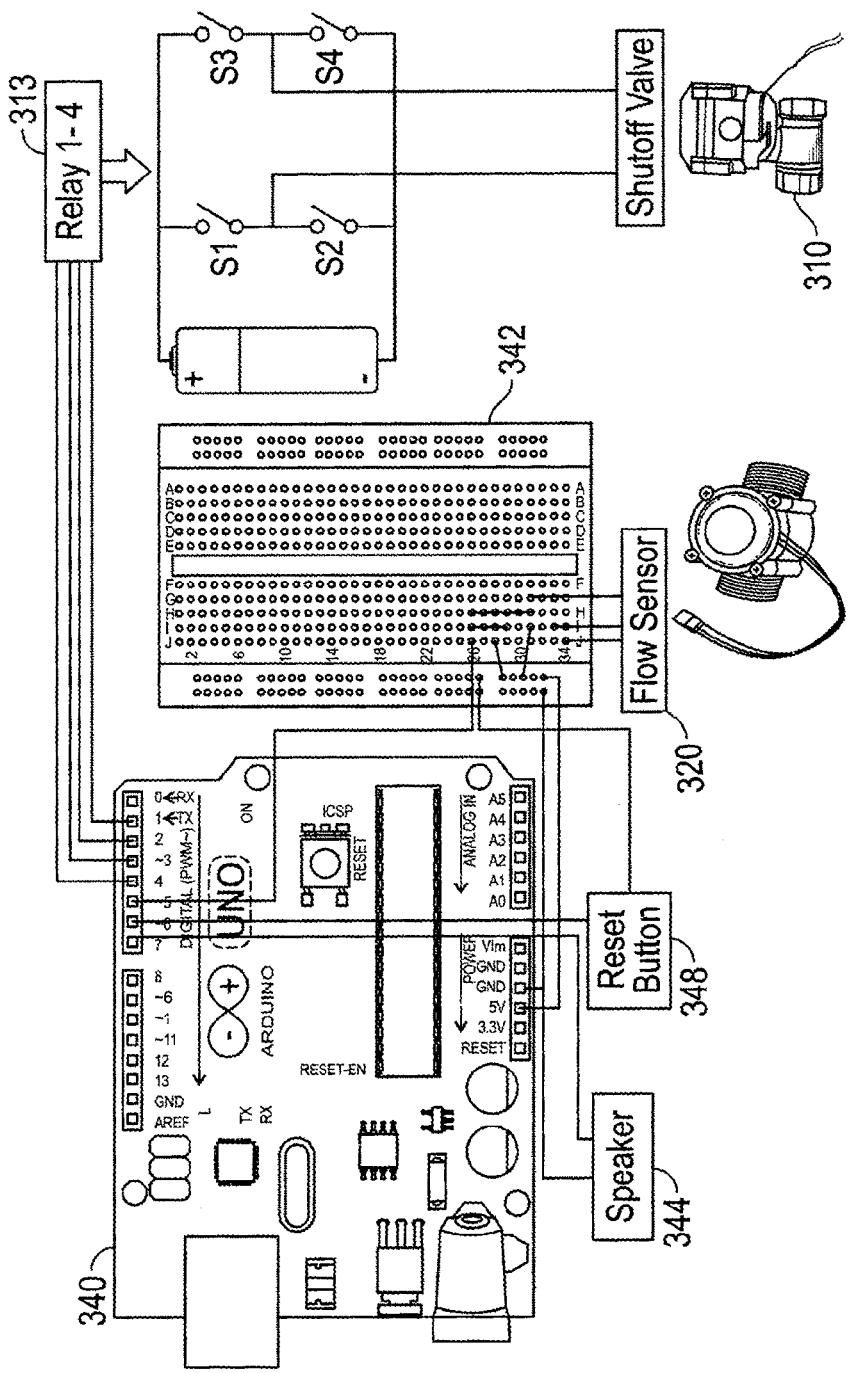
FIG. 8 is a schematic view of a microprocessor controller used with the valve assembly shown in FIG. 6.

Referring to FIG. 8, controller 340 is a programmable microprocessor that can be powered by a DC power source 314, such as, for example, a 9-volt battery. In an exemplary embodiment, controller 340 can be an Arduino Uno board, although those skilled in the art will recognize that other controllers can be used. Optionally, controller 340 may be electronically coupled to an audible alarm 344 and/or a visual indicator (not shown) to alert a person that excessive fluid is flowing through valve assembly 300. Optionally, controller 340 can also be electronically coupled to an external alarm, such as to a home security system (not shown). Controller 340 can be hard-wired to the security system or controller can be wirelessly coupled to the security system, such as by wire-free communications. Still optionally, controller 340 can be electronically coupled to a cell phone or other mobile device application ("app") that can wirelessly transmit an electronic signal to a mobile device to alert a user that excessive fluid is flowing through valve assembly 300.

Valve controller 312 uses a known H-bridge circuit to operate a motor therein that is attached to valve 310. In a first configuration, when voltage is applied through controller 340 to valve controller 312, valve 310 opens to allow flow therethrough. In a second configuration, when voltage is applied through controller 340 to valve controller 312, valve 310 closes to prevent flow therethrough. A relay 313 determines how the H-bridge circuit is configured to either open or close valve 310.

Figure 9:
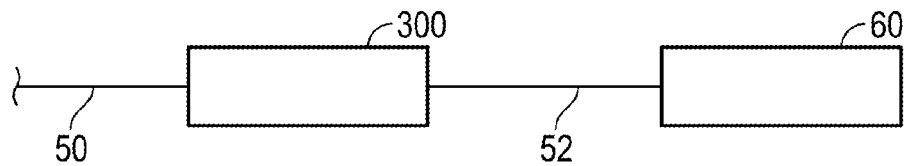
FIG. 9 is a schematic view of the control/shut-off valve assembly shown in FIG. 6 used in conjunction with a toilet.

In an exemplary application, valve assembly 300 can be installed on the water supply to a toilet 60, as shown in FIG. 9. Supply line 50 provides water from a household water supply to valve assembly 300, while discharge line 52 supplies water from valve assembly 300 to toilet 60.

Flow meter 320 senses flow of water into the toilet tank from supply line 50, through valve assembly 300, when the tank is filling, such as, for example, after a flush. Typically, the average flow of water into the toilet tank is between about zero (0) and about three (3) gallons per minute. When fluid flow is zero gallons per minute, flow meter 320 is not operating and valve 310 is open.

When flow meter 320 senses a fluid flow, such as when the toilet is flushed and the toilet tank is filling, the timer on controller 340 starts, thereby tracking the time that fluid flows through valve assembly 300, as well as allowing controller 340 to calculate the amount of fluid flowing through valve assembly 300, based on the time, as well as the size of flow meter 320, supply line 50, and discharge line 52.

If controller 340 senses that flow has stopped (i.e., toilet tank is filled and the fill valve in the toilet shuts off), then controller 340 stops measuring flow time and valve 310 stays open. If, however, controller 340 measures flow for over a predetermined period of time, such as, for example, about three (3) minutes, which may indicate that the fill valve in the toilet is defective and/or has not seated properly, allowing water to continue to fill the toilet tank, controller 340 transmits an electronic signal to valve controller 312, closing valve 310 and stopping fluid flow through valve assembly 300. Controller 340 also transmits an electronic signal to audible alarm 344 and/or visual indicator (not shown) to alert a person that an issue exists with regard to the water supply to the toilet.

Alternatively, if controller 340 calculates that more than a predetermined flow rate of fluid is flowing past flow meter 320, such as, for example, more than about three (3) gallons per minute, which may indicate a break in discharge line 52, controller 340 transmits an electronic signal to valve controller 312, closing valve 310 and stopping fluid flow through valve assembly 300. Similarly, controller 340 also transmits an electronic signal to audible alarm 344 and/or visual indicator to alert a person that an issue exists with regard to the water supply to the toilet.

Controller 340 also includes a reset button 348 that is used to reset controller 340 after valve assembly 300 closes due to a perceived leak or excessive flow through valve assembly 300. Pressing reset button 348 transmits a signal to controller 340, which in turn transmits a signal to relay 313 to configure the H-bridge circuit to open valve 310 and allow fluid flow through valve 310.

Figure 10:
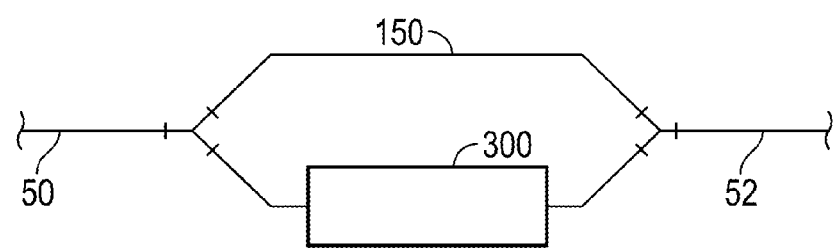
FIG. 10 is a schematic view of the valve assembly shown in FIG. 6 used in a building fluid supply line.

As shown in FIG. 10, valve assembly 300 can also be installed on a main water supply, such as, for example, where a water supply enters a building. Similar to the configuration of valve assembly 300 along a supply line 50 to a toilet, valve assembly 300 can be configured to monitor water flow to the building, and controller 340 can be programmed to secure valve 310 accordingly if an excessive amount of water is measured as flowing past flow meter 320. Further, similar to FIG. 4, valve assembly 300 can be used with a bypass assembly 150 that allows valve assembly 300 to be bypassed, if desired by a user.

For example, if controller 340 senses that flow has stopped (i.e., the flow rate is zero, meaning that no water is being used in the building), then controller 340 stops measuring flow time and valve 310 stays open. Controller 340 then resets flow time to zero.

If, however, controller 340 measures flow for over a predetermined period of time, such as, for example, about forty (40) minutes, which may indicate that a user has forgotten to close a water valve, such as, for example, an outside spigot, or there is a slight leak in discharge line 52, controller 340 transmits an electronic signal to valve controller 312, closing valve 310 and stopping fluid flow through valve assembly 300. Controller 340 also transmits an electronic signal to audible alarm 344 and/or visual indicator to alert a person that an issue exists with regard to the water supply to the building.

Alternatively, if controller 340 calculates that more than a predetermined flow rate of fluid is flowing past flow meter 320, such as, for example, more than about thirteen (13) gallons per minute, which may indicate a break in discharge line 52, controller 340 transmits an electronic signal to valve controller 312, closing valve 310 and stopping fluid flow through valve assembly 300. Similarly, controller 340 also transmits an electronic signal to audible alarm 344 and/or visual indicator to alert a person that an issue exists with regard to the water supply to the building.

While valve assembly 300 is discussed above using water as a fluid that flows through valve assembly 300, those skilled in the art will recognize that valve assembly 300 can be coupled to a gas or other fluid supply line and used to monitor the flow of gas or other fluid through valve assembly 300. If the flow of gas or other fluid is measured as being excessive, valve assembly 300 can activate to close valve 310, thereby stopping the flow of the gas or other fluid through valve assembly 300.

Figure 11:
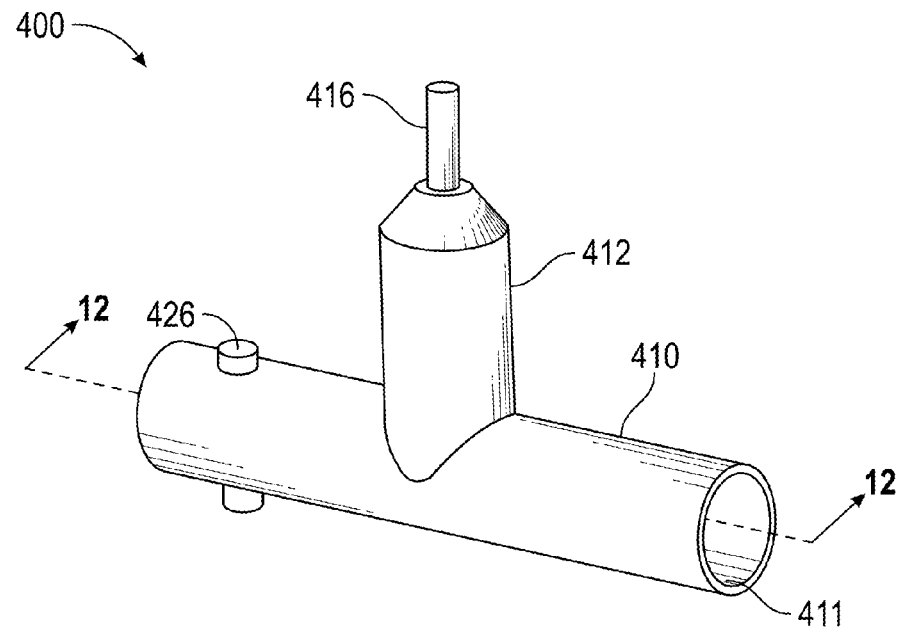
FIG. 11 is a perspective view of a valve assembly according to an alternative embodiment of the present invention.
Figure 12:
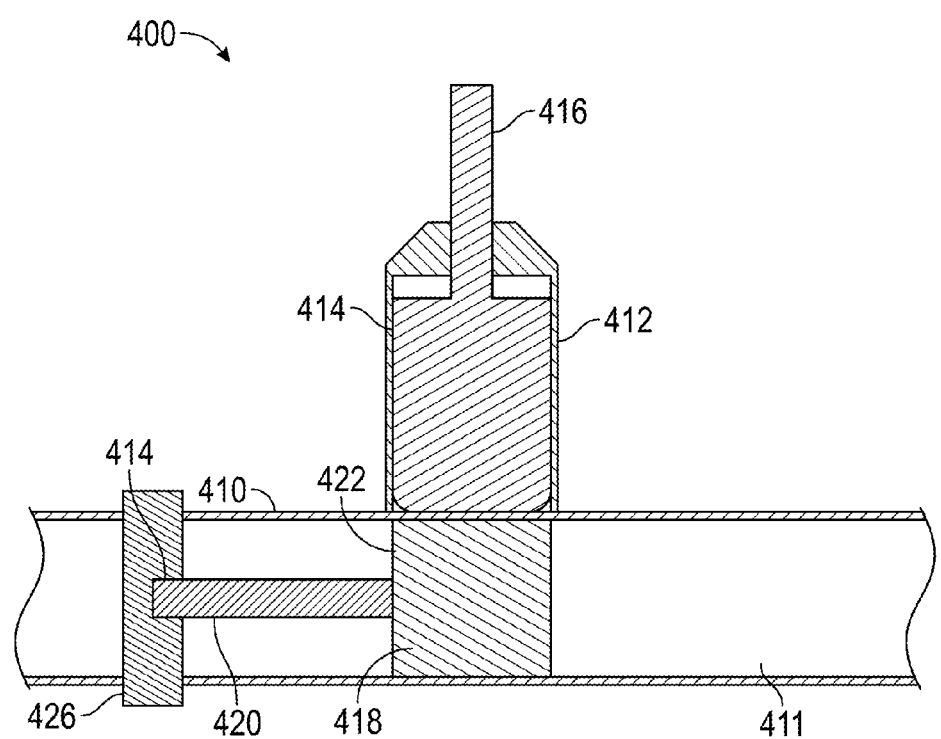
FIG. 12 is a sectional view taken along lines 12-12 of FIG. 11.

An alternative embodiment of a valve assembly 400 according to the present invention is shown FIGS. 11 and 12. Valve assembly 400 is a purely mechanical device that does not necessarily use any of the electronics used in valve assembly 300. Valve assembly 400 includes a valve body 410 that defines a fluid passage 411. Valve body includes a plunger housing 412 extending upwardly therefrom. Plunger housing 412 houses a plunger 414 that includes a stem 416 extending upwardly therefrom and outwardly from plunger housing 412. A porous filter block 418 is disposed within fluid passage 411 directly below plunger 414. Filter block 418 allows fluid to pass therethrough, but provides sufficient restriction of fluid flow such that the fluid flow builds upstream of filter block 418 (from the right as shown FIG. 12) and pushes filter block 418 through fluid passage 411.

A downstream end of filter block 418 includes a biasing member 420, such as a spring, that has a first end 422 engaged with filter block 418 and a second end 424 engaged with a pin 426 located within fluid passage 411. Pin 426 maintains second end 424 and allows biasing member 420 to compress toward pin 426 as filter block 418 is pushed downstream (to the left as shown in FIG. 12) by the fluid flow within fluid passage 411.

If fluid flows through passage 411 for a period of time less than an a priori calculated amount of time, such as less than a predetermined time to allow fluid to flow through filter block 418 before plunger 414 seals passageway 411 before fluid flow stops, biasing member 420 pushes filter block 418 upstream (to the right as shown FIG. 12), maintaining filter block 418 underneath plunger 414, and allowing subsequent fluid flow through passage 411.

If, however, fluid is flowing a sufficiently long amount of time through fluid passage 411 and through filter block 418, such as greater than the predetermined time to allow a desired amount of fluid flow past filter block 418 before plunger 414 is activated, fluid flow will have pushed filter block 418 sufficiently far enough downstream to allow plunger 414 to drop into fluid passageway 411, stopping the flow of fluid through passageway 411.

To reset valve assembly 400, a user grasps plunger stem 416, and pulls plunger 414 upward. When plunger 414 is above and out of passage 411, biasing member 420 forces filter block 422 upstream (to the right as shown FIG. 12) sliding filter block 418 underneath plunger 414 to secure plunger 414 within plunger housing 412, and allowing fluid flow through fluid passage 411.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A flow valve assembly comprising:
    a supply line;
    a discharge line;
    a valve disposed between the supply line and the discharge line, the valve being operable between an open position and a closed position;
    a controller operatively coupled to the valve to operate the valve between the open position and the closed position;
    a flow detector operatively connected to the controller, the flow detector determining an amount of fluid flow through the valve when the valve is in the open position, wherein the controller operates the valve from the open position to the closed position when the amount of fluid flow exceeds a predetermined value; and
    a bypass assembly comprising:
        a first bypass three way valve in the supply line;
        a second bypass three way valve in the discharge line; and
        a bypass line providing fluid communication between the first bypass valve and the second bypass valve, the bypass line providing fluid flow around the valve; and a bypass flow meter in fluid communication with the bypass line and an audible alarm operatively coupled to the flow meter such that, when the fluid flows through the bypass flow meter, the audible alarm is activated.

2. The flow valve assembly according to claim 1, wherein the controller is configured to determine flow rate of fluid through the flow meter and to transmit the electronic signal to the valve to operate the valve to the closed position upon receiving flow rate data exceeding a predetermined value.

3. The flow valve assembly according to claim 1, wherein the controller is configured to determine a time period of fluid through the flow meter and to transmit the electronic signal to the controller to operate the valve to the closed position upon receiving time period data exceeding a predetermined value.

4. The flow valve assembly according to claim 1, wherein the means for determining the amount of fluid comprises a diaphragm.

5. The flow valve assembly according to claim 4, wherein the means for operating the valve comprises a linkage arm operatively coupled to the diaphragm such that, when the linkage arm is in a first position, the valve is in the open position and when the linkage arm is in a second position, the valve is in the closed position.

6. The flow valve assembly according to claim 5, further comprising piston operable between a valve-open position and a valve-closed position and a biasing member operatively engaged with the piston such that, when the linkage arm is in the second position, the biasing member biases the piston from the valve-open position to the valve-closed position.

7. The flow valve assembly according to claim 1, wherein the means for determining the amount of fluid comprises a porous block disposed within the valve.

8. The flow valve assembly according to claim 7, wherein the porous block is operatively coupled to a biasing member such that, as fluid flows through the valve, the fluid biases the porous block against the biasing member.

9. The flow valve assembly according to claim 8, wherein, after a predetermined amount of the fluid has flowed through the valve, the porous block is moved to a location in the valve such that the valve moves to a closed position.

10. The flow valve assembly according to claim 1, wherein the first bypass three way valve and the second bypass three way valve each comprises a Y-valve.

11. The flow valve assembly according to claim 1, wherein the flow detector measures a pressure differential on a supply line side of the valve and on a discharge line side of the valve.

* * * * *